United States Patent Office 2,876,620
Patented Mar. 10, 1959

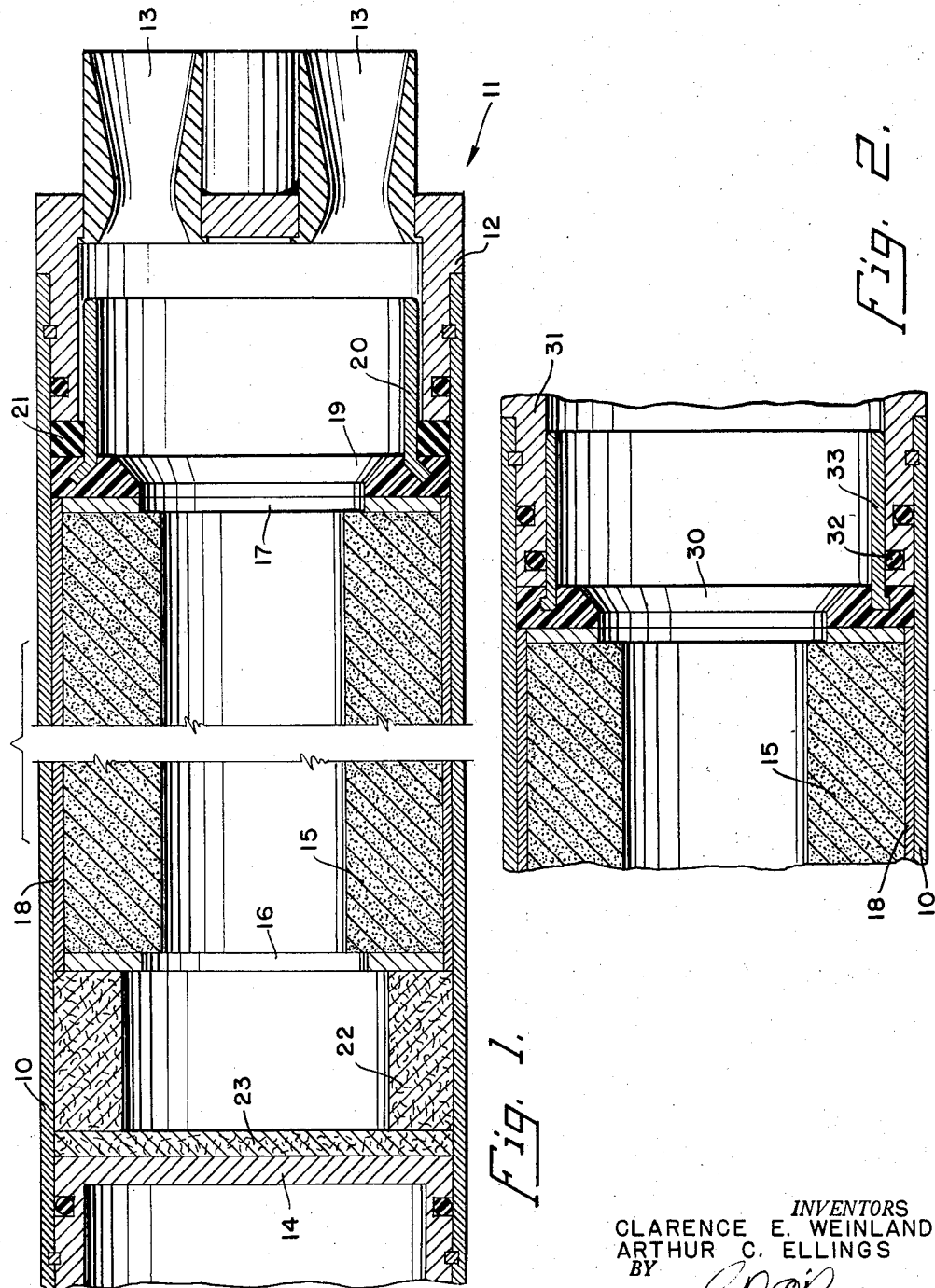

2,876,620

ROCKET MOTOR ASSEMBLY

Clarence E. Weinland and Arthur C. Ellings, Inyokern, Calif.

Application December 1, 1953, Serial No. 395,625

5 Claims. (Cl. 60—35.6)

(Granted under Title 35, U. S. Code (1952), sec. 266)

The invention described herein may be manufactured and used by or for the Government of the United States of America for governmental purposes without the payment of any royalties thereon or therefor.

The present invention relates to rockets and more particularly to an improved propellant grain supporting and obturation assembly for thin-walled rockets.

The desirability of utilizing thin-walled tubing to form the motor housing of solid, internal-burning propellant rockets is well known to the prior art. Such arrangement has not been feasible in the past, however, owing mainly to the inability to effectively preclude the flow of hot gases generated by the burning propellant, between the motor housing and the outer surface of the propellant grain, which hot gases have, in the past, caused burning out of the thin, temperature-sensitive tubing comprising the housing. Thus, in the absence of a gas-tight seal between the grain and motor tube, the relatively high pressures necessarily existing at the forward end of the grain result in the leakage of hot combustion gases between the grain and motor tube to the relatively lower pressure area adjacent the after end of the grain with a consequent burning of the motor tube.

Numerous difficulties have been encountered in the design of a grain supporting and sealing arrangement for effectively preventing such gas leakage, the foremost of which difficulties stems from the different coefficients of thermal expansion of commonly used propellant grains and motor tube materials. Thus, the thermal expansion coefficient of the grains generally employed in rockets of the type involved in the present invention are excessively high as compared with the coefficients of thermal expansion of the materials commonly comprising the rocket motor housing.

The present invention contemplates obturator means, including a resilient seal ring, at the after end of the grain for providing an annular, gas-tight seal between the after end of the grain and the nozzle plate, and a damped compression spring, which may take the form of a ring or pad of felt or other resilient material having suitable damping properties, at the forward end of the grain, the spring being placed under compression upon assembly for urging the grain in the direction of the nozzle plate whereby to maintain the obturator elements in gas-tight engagement notwithstanding the differential expansion and contraction of the grain and other rocket motor components, resulting from variations in the ambient temperature during storage or from the high temperatures arising during the propellant burning period. Moreover, such a damped resilient support at the forward end of the grain serves to absorb the impact forces incident to handling of the rocket.

The present invention, thus, successfully avoids the disadvantages which have been associated with the prior art arrangements for preventing the leakage of combustion gases between the motor tube and grain, which arrangements generally employed a rigid seal betwen the grain and nozzle plate, such as a connector ring and a fixed ring gasket, that was rendered defective as a result of shock forces occasioned during handling.

In accordance with the foregoing, it is a primary object of the present invention to provide an improved grain supporting and obturation assembly for thin-walled rockets.

Another object of the invention is to provide an arrangement for preventing the leakage of combustion gases between the outer surface of the propellant grain and the motor tube in a thin-walled rocket and including an obturator assembly at the after end of the grain and a damped compression spring at the forward end of the grain for urging the latter toward the nozzle plate whereby to maintain the obturator elements in gas-tight engagement throughout the periods of differenial expansion and contraction of the rocket components.

Still another object of the invention is the provision of an improved grain supporting and obturator assembly for thin-walled rockets for preventing the flow of combustion gases between the outer surface of the propellant grain and the motor tube, comprising a sleeve fixed to the after end of the grain and extending into the nozzle plate, a seal ring encircling said sleeve and adapted to sealingly engage the nozzle plate, and a compressed, elastic restraining member at the forward end of the grain for urging the grain toward the nozzle plate whereby to retain the obturator elements in gas-tight contact with the nozzle plate throughout substantially the entire propellant burning period.

A further object of the invention is to provide a grain supporting and obturator assembly as in the foregoing which is especially adapted for use with propellant grains having relatively high coefficients of thermal expansion.

Still a further object of the invention is to provide a grain supporting and obturator assembly as in the foregoing which is adapted to withstand rough handling and the vibrations arising during the flight of the rocket without adverse effect on the grain or obturator means.

Other objects and many of the attendant advantages of the present invention will become apparent as the same becomes better understood from the following detailed description had in conjunction with the annexed drawings wherein:

Fig. 1 is a longitudinal sectional view of the afterbody of a rocket embodying the improved grain support and obturator assembly of the present invention; and Fig. 2 is a partial longitudinal sectional view of a rocket embodying a modified form of the obturator means of the present invention.

The rocket assembly, as shown in Fig. 1, comprises a thin-walled rocket motor tube 10, formed of aluminum or other metal, which is open at its after end. Secured in the open after end of the rocket motor tube is a nozzle assembly 11 comprising a nozzle plate 12 and a plurality of discharge nozzles 13. Fixed within the motor tube, forwardly of the nozzle assembly, is a front closure member 14 secured to the motor tube. The space between the nozzle assembly 11 and the forward closure member 14 forms a combustion chamber within which is positioned an internal-burning propellant grain assembly comprising a grain 15 having secured to opposite ends thereof annular members 16 and 17 which may be of plastic or other suitable material, the grain being fitted within a cylindrical sleeve member 18 slidably received within motor tube 10. It will be apparent that in the absence of means providing a seal between the propellant grain assembly and the motor tube, the differential pressure necessarily existing between the forward and after ends of the grain during the burning period will result in a leakage of combustion gases from the high pressure area at the forward end of the grain, along the outer surface of sleeve 18 to the low pressure area adjacent the nozzle end of the grain. Inasmuch as motor tube 10 is extremely temperature-sensitive, owing to its thin-walled construction, and is subject to failure from excessive heating or as a result of reaction with the hot combustion gases, it is necessary that such leakage be prevented. To this end, the present invention provides a resilient forward grain support and an after obturator assembly, for maintaining an effective gas-tight seal between the after end of the propellant grain and the nozzle plate which will effectively prevent the flow of combustion gases between the outer surface of shell 18 and rocket motor tube 10. The obturator assembly of the present invention comprises, in the modification of Fig. 1, a ring 19, of plastic or other suitable material, which has its forward face cemented to the after washer member 17 and has embedded therein the flanged portion of a sleeve 20 which projects into the nozzle plate 12. Supported on sleeve 20 is a resilient seal ring 21, which may be square in cross section as shown, having its after face in sealing engagement with the forward end surface of nozzle plate 12 and its forward face in sealing engagement with the ring 19. In order that the obturator means be completely effective, it is necessary that the seal ring 21 be retained in sealing contact with ring 19 and nozzle plate 12 throughout the periods of differential expansive and contractual movement of the rocket components arising during the propellant burning period due to the aforementioned varying coefficients of thermal expansion. Moreover, in order that the arrangement be acceptable from the standpoint of service, it is required that the seal be not rendered defective as a result of rough handling. To this end there is provided at the forward end of the propellant grain assembly a charge support ring 22 engaging at its after end annular member 16 and at its forward end a charge support disc 23. Charge support ring 22 and disc 23 may be comprised of felt or other resilient material having suitable damping characteristics and act as a damped compression spring. Upon assembly of the propellant grain assembly within the motor tube 10 the charge support ring and disc are placed under compression whereby seal ring 21 will be maintained in sealing engagement with the nozzle plate 12 and the ring 19.

Referring now to Fig. 2, there is illustrated a modified arrangement of the obturator means of the present invention wherein a ring 30, corresponding to ring 19 in Fig. 1, directly engages the forward end face of the nozzle plate 31 and a resilient O-ring 32 is disposed in a groove formed in nozzle plate 31 and resiliently engages the outer surface of the obturator sleeve 33 whereby to effectively seal the after end of the propellant grain plate to the nozzle assembly and prevent the leakage of gas between sleeve 18 and motor tube 10. The forward end of the grain assembly may be supported by a resilient charge support ring and disc as in Fig. 1.

It will be apparent from the above description that the present invention provides an improved flexible grain support and obturator assembly for maintaining a gas-tight seal at the after end of the flow space between the outer surface of the propellant grain assembly and the rocket motor tube whereby to prevent the leakage of combustion gases through such flow space and thus eliminate motor tube burnout. Moreover, it will be appreciated, from the foregoing that owing to the resilient damping characteristics of the grain forward end support, the obturator means will not be rendered defective by variations in propellant grain length during burning, or as a result of impact forces incident to handling.

It will be apparent from the above description that many modifications are possible in the light of the above teachings. It is therefore to be understood that within the scope of the appended claims the invention may be practiced otherwise than as specifically described herein.

What is claimed is:

1. In a rocket motor assembly including a thin-walled motor tube, having a cup shaped nozzle plate fixed in the after end thereof, and a solid, internal-burning propellant grain within the tube, the improvements comprising obturator means including a sleeve fixed to said grain and extending into the nozzle plate, a seal ring encircling said sleeve and engaging the nozzle plate; and a restraining member having vibration damping properties at the forward end of said grain for resiliently positioning the grain and for retaining the seal ring in gas-tight engagement with said sleeve and nozzle plate whereby to prevent leakage of combustion gases between the outer surface of the grain and the motor tube.

2. In a rocket motor assembly including a thin-walled motor tube, having a cup-shaped nozzle plate fixed in one end thereof, and a solid, internal-burning propellant grain within the tube, the improvements comprising obturator means including an annular member sealed to the after end of said grain, a sleeve attached to said annular member and extending into the nozzle plate, a resilient seal ring encircling said sleeve and engaging said annular member and nozzle plate; and a compressed resilient restraining member at the forward end of said grain, said member having vibration damping properties and serving to resiliently position the grain and to retain said seal ring in gas-tight engagement with said annular member and nozzle plate whereby to prevent the leakage of combustion gases between the outer surface of said grain and the motor tube.

3. In a rocket motor assembly comprising a thin-walled motor tube, having a cup shaped nozzle plate fixed in the after end thereof, and a solid, internal-burning propellant grain within the tube, the improvements comprising obturator means including an annular member sealed to the after end of said grain, a sleeve attached to said annular member and extending into the nozzle plate, a resilient O-ring encircling said sleeve and disposed in an annular groove in the nozzle plate for providing a gas-tight seal between said sleeve and nozzle plate; and a compressed resilient restraining member having vibration damping characteristics at the forward end of said grain for resiliently positioning said grain with said O-ring in gas-tight engagement with said sleeve and nozzle plate whereby to prevent the leakage of gases between the outer surface of said grain and the motor tube.

4. The arrangement according to claim 2 wherein said restraining member is comprised of felt.

5. In a rocket motor assembly including a thin-walled motor tube having a cup shaped nozzle plate fixed in the after end thereof, a solid, internal-burning propellant grain within the tube, and a compressed, elastic restraining member at the forward end of the grain for urging the latter toward the nozzle plate, the improvements comprising obturator means including a sleeve fixed to the after end of said grain and extending into said nozzle plate, a resilient seal ring encircling said sleeve and adapted to sealingly engage said nozzle plate.

References Cited in the file of this patent

UNITED STATES PATENTS 2,539,404   Crutchfield et al. _____ Jan. 30, 1951

FOREIGN PATENTS 859,352   France _____ June 3, 1940